United States Patent [19]
Koo

[11] Patent Number: 5,621,710
[45] Date of Patent: Apr. 15, 1997

[54] CD-ROM DRIVE AND A CONTROL METHOD FOR OPTIMALLY CONTROLLING THE SPINDLE MOTOR

[75] Inventor: Bon H. Koo, Seoul, Rep. of Korea

[73] Assignee: LG Electronics Inc., Seoul, Rep. of Korea

[21] Appl. No.: 501,993

[22] Filed: Jul. 13, 1995

[30] Foreign Application Priority Data

Jul. 14, 1994 [KR] Rep. of Korea .................. 16993/1994

[51] Int. Cl.⁶ ...................................................... G11B 7/00
[52] U.S. Cl. ................................................ 369/50; 369/32
[58] Field of Search .......................... 369/124, 32, 44.27, 369/44.28, 44.29, 54, 50

[56] References Cited

U.S. PATENT DOCUMENTS

| | | | |
|---|---|---|---|
| 5,216,647 | 6/1993 | Kitani | 369/50 |
| 5,270,992 | 12/1993 | Yasuda et al. | 369/50 |
| 5,309,419 | 5/1994 | Koike | 369/80 |
| 5,412,629 | 5/1995 | Shirane | 369/50 |
| 5,432,766 | 7/1995 | Ando et al. | 369/50 |
| 5,463,604 | 10/1995 | Naito | 369/50 |
| 5,497,360 | 3/1996 | Takahara et al. | 369/54 |

*Primary Examiner*—Nabil Hindi
*Attorney, Agent, or Firm*—John P. White

[57] ABSTRACT

CD-ROM drive, including a pick-up for detecting recorded data from a CD-ROM, a control signal generation part for generating a acceleration/deceleration control signal, a driving extent control signal, and a guaranteed frame synchronizing signal by processing a high frequency signal received from the pick-up, an acceleration/deceleration control part for receiving the acceleration/deceleration control signal, the driving extent control signal, and the guaranteed frame synchronization signal from the control signal generation part, outputting the acceleration/deceleration control signal and the driving extent control signal as a driving signal and a driving extent signal respectively in case mode is not a searching mode but a normal linear velocity mode, and generating a driving signal and a driving extent signal based on a result obtained by subjecting the acceleration/deceleration control signal, the driving extent control signal, and the guaranteed frame synchronization signal to an operation so that the guaranteed frame synchronization signal can reach to high voltage within a short time in case the mode is a searching mode, and a spindle motor for rotating the CD-ROM in response to the driving signal and the driving extent signal received from the acceleration/deceleration control part; and a method for controlling the CD-ROM drive.

9 Claims, 10 Drawing Sheets

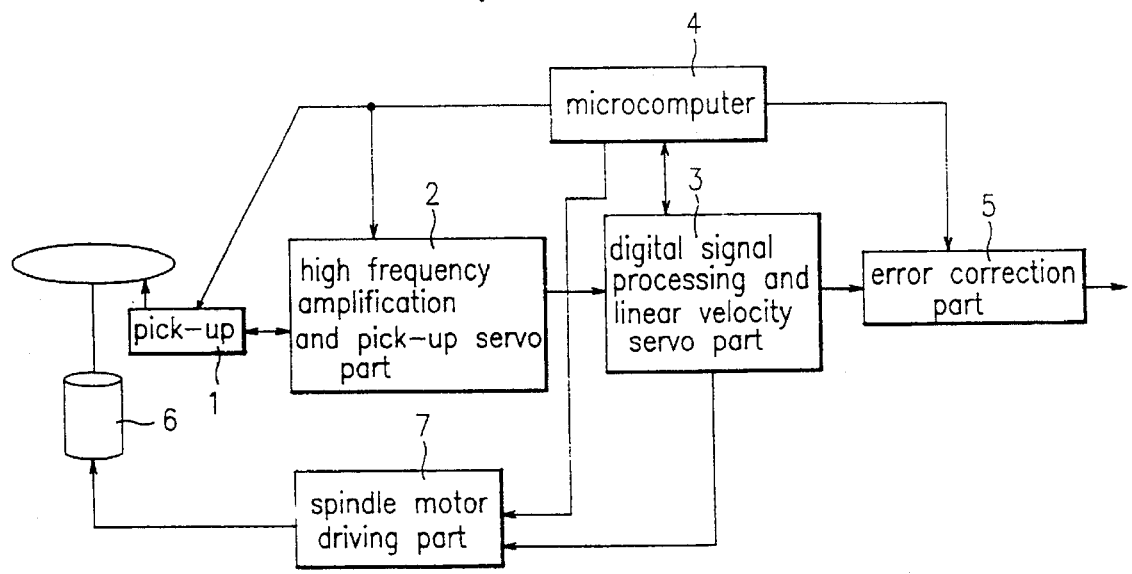

prior art

FIG.7
| M-DIR | DIR-CLV | GFS | ALU mode control output | spindle motor control condition during search |
|---|---|---|---|---|
| 0 | 0 | 0 | F = A + B | lack of brake |
| 0 | 0 | 1 | F = A | normal |
| 0 | 1 | 0 | F = A − B | excess of brake |
| 0 | 1 | 1 | F = A | normal |
| 1 | 0 | 0 | F = A − B | excess of kick |
| 1 | 0 | 1 | F = A | normal |
| 1 | 1 | 0 | F = A + B | lack of kick |
| 1 | 1 | 1 | F = A | normal |
FIG.8A
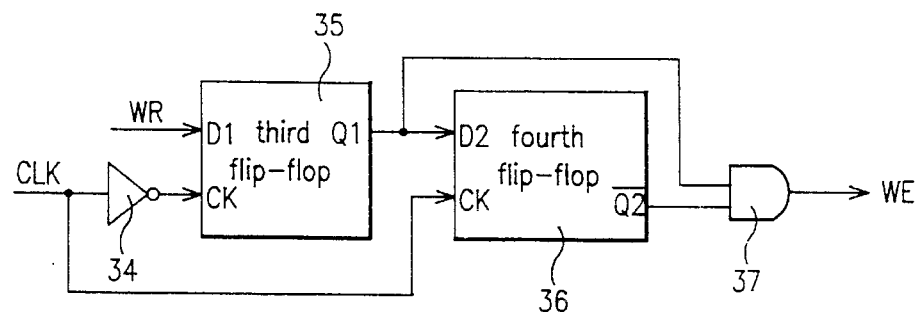
FIG.8B
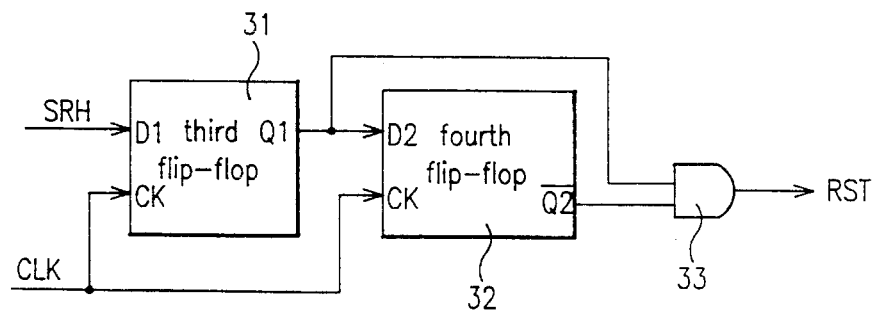

FIG.10A    the present section number

FIG.10B    destined section number

FIG.10C    search — duration of slide movement

FIG.10D    PWM-CONT    PWM-CLV  X  comparator output  X  PWM-CLV

FIG.10E    DIR-CONT    DIR-CLV  X  M-DIR  X  DIR-CLV

FIG.10F    counter output    counted value — identical to an output of the register file FIG.10G    comparator output — spindle motor acceleration/deceleration section

FIG.10H    WR

FIG.10I    register file output — stored value — change of stored value

CD-ROM DRIVE AND A CONTROL METHOD FOR OPTIMALLY CONTROLLING THE SPINDLE MOTOR

BACKGROUND OF THE INVENTION

This invention relates to a CD-ROM drive, more particularly to a CD-ROM drive and its control method, which can make an optimal control of the spindle motor with a digital circuit at searching.

As shown in FIG. 1, a conventional CD-ROM drive includes a pick-up 1 for detecting data recorded in a CD-ROM by directing laser beams onto the CD-ROM rotated by a spindle motor 6, a high frequency amplification and pick-up servo part 2 for amplifying the high frequency signals received from the pick-up 1 and for making servo operations to control position of a lens in the pick-up 1, a digital signal processing and linear velocity servo part 3 for digital processing the high frequency signals amplified in the high frequency amplification and pick-up servo part 2 to decode the signals into original information and generating acceleration/deceleration control signals DIR-CLV and driving extent control signals PWM-CLV, an error correction part 5 for processing error correction of the decoded signals received from the digital signal processing and linear velocity servo part 3, and applying the error corrected signals to a computer(not shown), a spindle motor driving part 7 for computing driving voltage using the acceleration/deceleration control signals DIR-CLV and the driving extent control signals PWM-CLV received from the digital signal processing and linear velocity servo part 3 and applying the driving voltage to the spindle motor 6, and a microcomputer 4 for controlling the above various parts.

Operation of the CD-ROM drive of FIG. 1 having foregoing system is to be explained hereinafter, referring to FIGS. 2 and 3.

First, when the pick-up 1 reads in recorded information from a CD-ROM by directing a laser beam onto the CD-ROM rotated by the spindle motor 6, the high frequency amplification and pick-up servo part 2 amplifies a high frequency signal received from the pick-up 1 so that the signal has a predetermined gain, and, on the same time, makes a servo operation for controlling position of the lens in the pick-up 1.

In this instant, the digital signal processing and linear velocity servo part 3 digital processes the high frequency signal amplified in, and received from the high frequency amplification and pick-up servo part 2 to decode the signal into an original signal, and the error correction part 5 makes an operation of an error correction algorithm proper to the CD-ROM to correct errors in the decoded signal, and applies the error corrected signal to a computer(not shown).

And, the digital signal processing and linear velocity servo part 3 makes an operation of an output of the high frequency amplification and pick-up servo part 2, and generates a acceleration/deceleration control signal DIR-CLV and a driving extent control signal PWM-CLV for controlling direction of rotation and driving extent of the spindle motor 6.

That is, in controlling the spindle motor 6, a PWM(Pulse Width Modulation) method is used for improvement of efficiency and reduction of heat generation of the spindle motor driving part 7 wherein the acceleration/deceleration control signal DIR-CLV as shown in FIG. 2A, a signal for controlling whether to accelerate or decelerate the spindle motor 6, accelerates the spindle motor 6 at high voltage of the control signal and decelerates the spindle motor 6 at low voltage of the control signal, and the driving extent control signal PWM-CLV as shown in FIG. 2B, a signal for controlling an extent of drive, becomes into a high voltage condition at every cycle of the pulse width modulation carrier and maintains the high voltage condition for a duration proportional to the driving extent.

Accordingly, the longer the duration of the high voltage condition of the driving extent control signal, the more the extent of acceleration or deceleration in a direction corresponding to the acceleration/deceleration control signal DIR-CLV.

And, the microcomputer 4 controls the above parts while the foregoing operations are made.

In the meantime, in case when the pick-up 1 should be moved from a particular spot to another spot of the CD-ROM for searching operation, the microcomputer 4 should move a slide for moving the pick-up 1 to a desired position, and on the same time, in order to satisfy a characteristic of constant linear velocity of a CD-ROM, the microcomputer 4 should accelerate rotation of the spindle motor 6 when the pick-up 1 is to move from an outer circumference to an inner circumference of the CD-ROM, and should decelerate rotation of the spindle motor 6 when the pick-up is to move from an inner circumference to an outer circumference of the CD-ROM.

In this case, a method is used that controlling rotation of the spindle motor 6 using a particular part(frame sync in most cases) of a signal extracted by the pick-up 1. However, since the spindle motor 6 can not be reached to a normal rotation speed within a short time even though the constant linear velocity CLV is automatically controlled after the slide is moved, the spindle motor 6 should be enforced to accelerate or decelerate to reach to the normal rotation speed within a short time.

When the foregoing operation is an operation in a searching shown in FIGS. 3A to 3F, the operation is to be explained referring to wave patterns of driving voltage DM and GFS(Guaranteed Frame Sync) of the spindle motor 6.

Being an output signal of the high frequency amplification and pick-up servo part 2 processed in, and output from the digital signal processing and linear velocity servo part 3, the GFS at high voltage indicates the spindle motor 6 is rotating in the normal speed, and the GFS at low voltage indicates the spindle motor 6 is rotating in a speed faster or slower than the normal speed.

That is, FIGS. 3A to 3C indicate cases when the spindle motor 6 is accelerated when the pick-up 1 is searching the CD-ROM while moving from an outer circumference to an inner circumference, and FIGS. 3D to 3F indicate cases when the spindle motor 6 is decelerated when the pick-up 1 is searching the CD-ROM while moving from an inner circumference to an outer circumference.

Herein, FIGS. 3A and 3D indicate cases when the spindle motor 6 is properly accelerated or decelerated for a duration of search(TK or TB) so that the GFS reaches to high voltage right after finishing the search, cases when the acceleration and the deceleration are done properly.

And, FIG. 3B indicates a case when the acceleration lacks, FIG. 3C indicates a case when the acceleration is excessive, FIG. 3E indicates a case when the deceleration lacks, and FIG. 3F indicates a case when the deceleration is excessive, respectively.

And, alike the GFS in FIGS. 3A and 3D, the GFS in FIGS. 3B, 3C, 3E, and 3F indicate cases when high voltage is not reached at once but after delay for a certain period of time.

However, even if the searching has been finished, the GFS does not reach to high voltage at once but reaches after a certain duration of driving of the spindle motor 6 for compensating the lack or excess.

Therefore, the conventional CD-ROM drive has problems in that it can not carry out the searching operation which is an important function of the CD-ROM within a short time because the duration in which GFS reaches to high voltage after finish of the searching is delayed if an appropriate acceleration or deceleration operation is not made.

That is, even though the conventional CD-ROM drive has its spindle motor accelerated or decelerated during the searching period of time based on experimental data(duration of acceleration or deceleration) for accomplishing a short access time period, in cases when the CD-ROM is changed or a weight deviation of the CD-ROM is great, since the experimental data is not applicable anymore, rotation of the spindle motor can not be controlled appropriately.

SUMMARY OF THE INVENTION

The object of the invention devised for solving the foregoing problems is to provide a CD-ROM drive and a method for controlling the CD-ROM drive, which can carry out a searching operation which is an important function of the CD-ROM within a short time.

Other object of the invention is to provide a CD-ROM drive and a method for controlling the CD-ROM drive, which can control rotation of the spindle motor even in cases when the CD-ROM is changed or a weight deviation of the CD-ROM is great.

These and other objects and features of this invention can be achieved by providing a CD-ROM drive, including a pick-up for detecting recorded data from a CD-ROM, a control signal generation part for generating a acceleration/deceleration control signal, a driving extent control signal, and a guaranteed frame synchronizing signal by processing a high frequency signal received from the pick-up, an acceleration/deceleration control part for receiving the acceleration/deceleration control signal, the driving extent control signal, and the guaranteed frame synchronization signal from the control signal generation part, outputting the acceleration/deceleration control signal and the driving extent control signal as a driving signal and a driving extent signal respectively in case mode is not a searching mode but a normal linear velocity mode, and generating a driving signal and a driving extent signal based on a result obtained by subjecting the acceleration/deceleration control signal, the driving extent control signal, and the guaranteed frame synchronization signal to an operation so that the guaranteed frame synchronization signal can reach to high voltage within a short time in case the mode is a searching mode, and a spindle motor for rotating the CD-ROM in response to the driving signal and the driving extent signal received from the acceleration/deceleration control part.

BRIEF DESCRIPTION OF THE DRAWINGS

FIG. 1 is a block diagram showing a system of a conventional CD-ROM drive.

FIG. 2A shows a wave pattern of an acceleration/deceleration control signal which controls the spindle motor in FIG. 1.

FIG. 2B shows a wave pattern of a driving extent control signal which controls the spindle motor in FIG. 1.

FIG. 7 is an operation logic table of the addition/subtraction mode determination part of FIG. 6.

FIG. 8A is a detailed circuit diagram of the first pulse generator of FIG. 6.

FIG. 8B is a detailed circuit diagram of the second pulse generator of FIG. 6.

FIGS. 10A to 10I illustrate wave patterns showing an example of an operation of the CD-ROM drive in accordance with this invention.

DETAILED DESCRIPTION OF THE PREFERRED EMBODIMENT

This invention is to be explained hereinafter, referring to the attached drawings.

This invention provides a CD-ROM drive which can make its spindle motor control a CD-ROM loaded at the present time the most appropriately by making the GFS to reach to high voltage within a short time after a searching is finished through dividing the CD-ROM information area into N sections, carrying out searching operations classifying by the sections, measuring acceleration/deceleration control durations of the spindle motor required in each of the searching, and storing the average values of the required durations into a microcomputer, and at initialization with the average values stored in the microcomputer read in, repeating renewing operations of the average values of acceleration/deceleration control durations of the spindle motor with new average values obtained from control conditions of the spindle motor automatically determined every time a searching operation is made.

Figure 4:
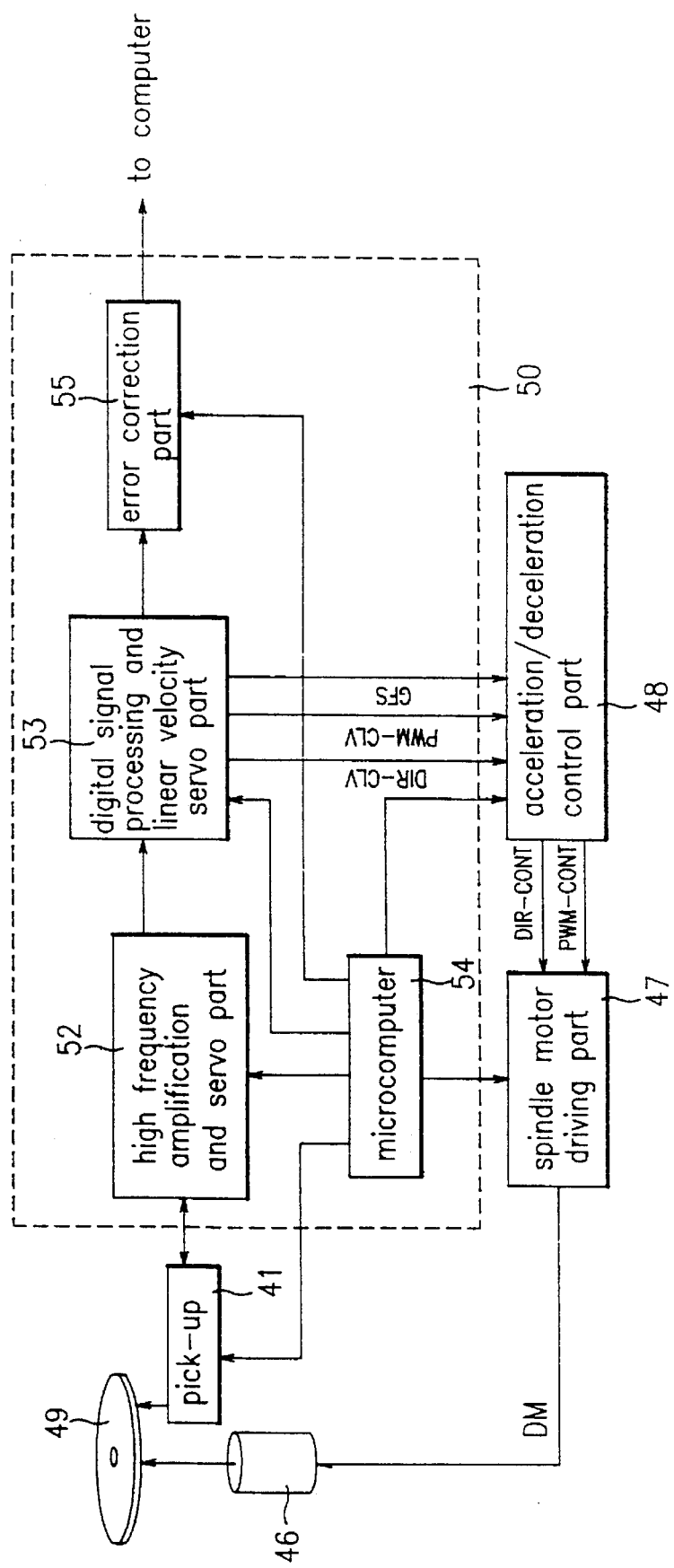
FIG. 4 shows a block diagram of a CD-ROM drive in accordance with this invention.
Figure 6:
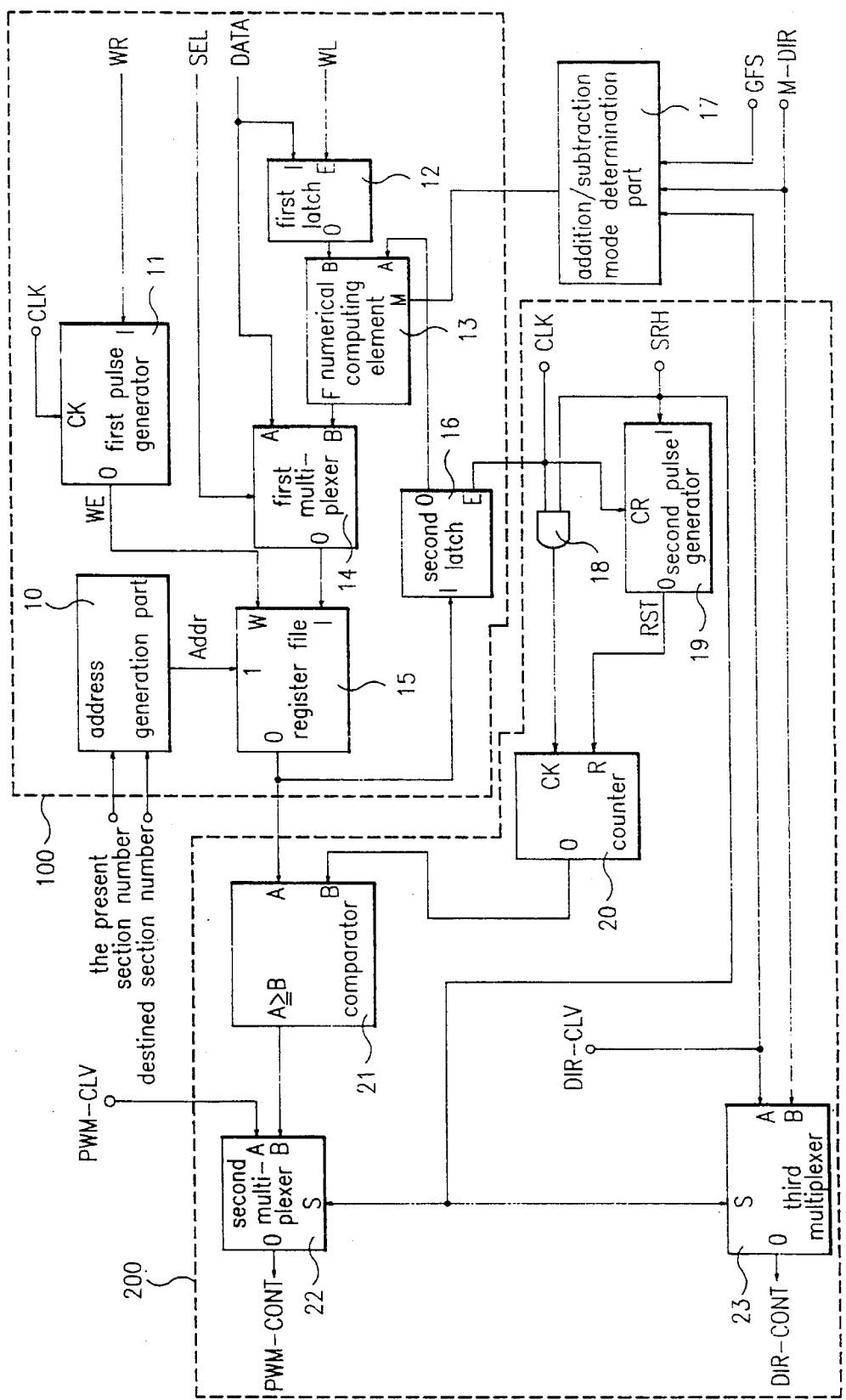
FIG. 6 is a circuit diagram of the acceleration/deceleration control part of FIG. 4.

FIG. 4 shows a block diagram of a CD-ROM drive in accordance with this invention, FIG. 6 is a circuit diagram of the acceleration/deceleration control part of FIG. 4.

As shown in FIG. 4, the CD-ROM drive of this invention includes a pick-up 41, a control signal generation part 50, a spindle motor 46, a spindle motor driving part 47, and an acceleration/deceleration control part 48.

The control signal generation part 50 includes a high frequency amplification and servo part 52, a digital signal processing and linear velocity servo part 53, a microcomputer 54, and an error correction part 55.

The pick-up 41 detects recorded data from a CD-ROM 49.

The control signal generation part 50 processes a high frequency signal received from the pick-up 41 into an acceleration/deceleration control signal DIR-CLV, a driving extent control signal PWM-CLV, and a guaranteed frame synchronization signal GFS.

The acceleration/deceleration control part 48 applies the acceleration/deceleration control signal DIR-CLV and the driving extent control signal PWM-CLV received from the control signal generation part 50 to the spindle motor driving part 47 as a driving signal DIR-CONT and a driving extent signal PWM-CONT in case when it is not in a searching mode but in a normal linear velocity mode, and processes the acceleration/deceleration control signal DIR-CLV, the driving extent control signal PWM-CLV, and the guaranteed frame synchronization signal GFS into a driving signal DIR-CONT, and a driving extent signal PWM-CONT so that the guaranteed frame synchronization signal GFS can reach to high voltage within a short time, and applies them to the spindle motor driving part 47.

The spindle motor driving part 47 subjects the driving signal DIR-CONT and the driving extent signal PWM-CONT to an operation into a driving voltage.

The spindle motor 46 receives driving voltage DM to drive the CD-ROM 49.

The acceleration/deceleration control part 48 includes an addition/subtraction amount memorizing part 100 for adding/subtracting data received from the microcomputer 54 and store it into a memory at a relevant address, an addition/subtraction mode determination part 17 for setting an addition/subtraction mode based on determination of a condition of the spindle motor after a search by subjecting the acceleration/deceleration control signal DIR-CLV and the guaranteed frame synchronization signal GFS received from the digital signal processing and linear velocity servo part 53 and a driving direction determination signal M-DIR received from the microcomputer 54 to an operation, and a pulse width modulation pulse generation part 200 for generating driving signal DIR-CONT and driving extent signal PWM-CONT on reception of a signal from the addition/subtraction amount memorizing part 100.

The addition/subtraction amount memorizing part 100 includes a first pulse generator 11 for generating a write enable signal WE on reception of a write signal WR in response to a clock signal CLK, an address generator 10 for generating addresses for storing data on reception of section numbers at the present time and on a destination, a first latch 12 for holding data DATA from the microcomputer 54 after reception of a latch enable signal WL, a numerical computing element 13 for making an addition/subtraction computation with an output of the first latch 12 as an adding/subtracting numeral and another input as an added/subtracted numeral according to addition/subtraction mode, a first multiplexer 14 for selecting one signal from the output of the numerical computing element 13 and data of the microcomputer 54 in response to a selection signal SEL, a register file 15 to be enabled by the first pulse generator 11 for storing output of the first multiplexer 14 into an area assigned by the address generator 10, and a second latch 16 for holding output of the register file 15 and applying it to the numerical computing element 13 as an added/subtracted numeral according to clock CLK.

And, the pulse width modulation pulse generation part 200 includes an AND gate 18 for logical multiplication of a searching signal SRH and a clock signal CLK, a second pulse generator 19 for generating a reset signal RST on reception of the search signal SRH according to the clock signal, a counter 20 to be reset by an output of the second pulse generator 19 for counting an output of the AND gate 18, a comparator 21 for comparing an output of the counter 20 and an output of the register file 15 to output a high voltage comparison signal in case the output of the register file 15 is the same or greater than the output of the counter 20, a second multiplexer 22 for selecting one signal as a driving extent signal PWM-CONT from a driving extent control signal PWM-CLV from the digital signal processing and linear velocity servo part 53 and a signal from the comparator 21 according to a search signal SRH, and third multiplexer 23 for selecting one signal as a driving signal from a driving direction determination signal M-DIR from the microcomputer 54 and an acceleration/deceleration control signal DIR-CLV from the digital signal processing and linear velocity servo part 53 according to a search signal SRH.

The first, and second pulse generators 11 and 19 have systems as shown in FIGS. 8A and 8B.

As shown in FIG. 8A, the first pulse generator 11 includes an invertor 34 for inverting a clock CLK, a first flip-flop 35 for latching a write signal WR according to an output of the invertor 34, a second flip-flop 36 for latching a non-inverted output of the first flip-flop 35 according to a clock CLK, and an AND gate 37 for logical multiplification of an inverted output of the second flip-flop 36 and a non-inverted output of the first flip-flop 35 into a write enable signal WE.

As shown in FIG. 8B, the second pulse generator 19 includes a third flip-flop 31 for latching a search signal SRH according to a clock CLK, a fourth flip-flop 32 for latching a non-inverted output of the third flip-flop 31 according to a clock CLK, and an AND gate 33 for logical multiplification of an inverted output of the fourth flip-flop 32 and a non-inverted output of the third flip-flop 31 into a reset signal RST.

Operation and effects of this invention having the foregoing system is to be explained hereinafter, referring to FIGS. 5, 7, and 9 to 12.

Figure 5:
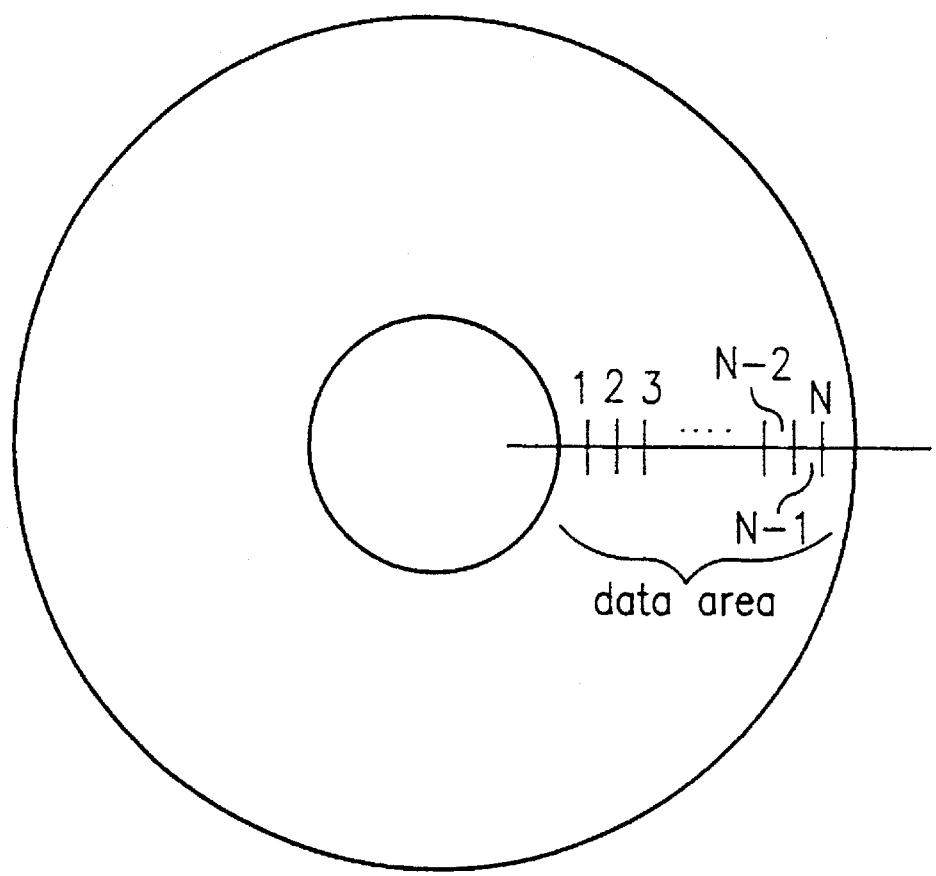
FIG. 5 shows an example of areal division of data in the CD-ROM of FIG. 4.

As shown in FIG. 5, of the N sections of the information area of a CD-ROM of this invention, the microcomputer 54 carries out searching operation by sections by controlling the pick-up 41, the high frequency amplification and servo part 52, the digital signal processing and linear velocity servo part 53, the error correction part 55, the spindle motor driving part 47, and the acceleration/deceleration control part 48, to measure the acceleration/deceleration control durations of the spindle motor during that time and to store the average values of the durations into an internal memory thereof. And, at system initialization, with the microcomputer 54 read in the average values stored in the internal memory, repeats renewing operation of the average values of the acceleration/deceleration control durations of the spindle motor with new average values obtained from control conditions of the spindle motor automatically determined every time a searching operation is made. Through the above process, at finishing the searching operations, the microcomputer 54 can make the guaranteed frame synchronization signal GFS reaches to high voltage within a short time, to let the spindle motor 46 drive the CD-ROM under reproduction at the present time the most appropriately.

First, upon initialization, the acceleration/deceleration control part 48 has, its first pulse generator 11 generate a write enable signal WE on reception of a write signal WR according to a clock CLK, its first multiplexer 14 set to select an input A in response to a selection signal SEL, and, as both the present section number and an initial destined section number has been set to "1", its address generator 10 generate a relevant address Addr for storing data, and to apply them to its register file 15.

In this instant, when data from the microcomputer 54 is applied to the register file 15 through the first multiplexer 14 and the first pulse generator 11 generates a write enable signal WE synchronized to a clock CLK, if the write signal WR is applied in a form of toggle pulses, the register file 15 is set into a write mode, to store the data received through the first multiplexer 14 into an area assigned by the address from the data address generator 10, and then, after increasing the destined section number by "1", by repeating the above operation, operations for storing the data from the microcomputer 54 into address areas along the present section number and the destined section number can be repeated as far as the destined section number is determined to be not over "N".

According to this, if the destined section number thus increased by "1" becomes greater than "N", destined section number is not increased anymore. However, as the next process, the present section number is increased by "1", and if the present section number is determined to be not greater than "N", the destined section number is set to "1" again, and until the present section number increased by "1" becomes greater than "N", the above operation is repeated again until the destined section number set to "1" again becomes greater than "N" at increasing the destined section number by "1".

And, operations of storing output data of the microcomputer 54 into address areas according to the destined section number thus increased by "1" and the present section number are repeated.

And, if the present section number thus increased by one is greater than "N", when the latch enable signal WL is received for changing data of the register file 15, the initialization is finished by applying the data DATA from the microcomputer 54 which has been held by the first latch 12 as the adding numeral or the subtracting numeral to the numerical computing element 13 at an input terminal thereof.

That is, after data of the microcomputer 54 is made selected according to reception of the selection signal of the first multiplexer 14, the write signal WR is controlled to be in a toggle form in order to store the experimental value into the assigned memory address. Operations in which the sectional acceleration/deceleration average values of the spindle motor 46 obtained while repetitively increasing the destined section number from "1" to "N" after setting the present section number, are stored into the register file 15 in advance, are repeated.

And, if the adding/subtracting data DATA of the microcomputer 54 is applied to the first latch 12 for storing a adding/subtracting numeral to be used for the addition/subtraction in advance, and the latch enable signal WL is generated in a toggle pulse form, by completing an operation for renewing data in the register file 15 with application of the adding/subtracting data DATA of the microcomputer 54 to the numerical computing element 13, the initialization is finished.

After the initialization is finished with the foregoing operations followed, in case the spindle motor 46 is to be controlled in a linear velocity control mode, since the search signal is at high voltage, the driving extent control signal PWM-CLV and the acceleration/deceleration control signal DIR-CLV received from the digital signal processing and linear velocity servo part 53 are applied to the second, and third multiplexers 22 and 23 at input terminals A thereof respectively, to generate the driving signal DIR-CONT and the driving extent signal PWM-CONT.

In this instant, if a search operation is required, after generating a selection signal SEL so that the first multiplexer 14 selects a signal produced through operation in the numerical computing element 13, the microcomputer 54 generates the present section number and experimental section number relevant to a searching area, and on the same time, compares whether the present section number is greater than the destined section number in order to determine direction of the search. According to the comparison, if the direction of the search is found to be from an inner circumference to an outer circumference of the CD-ROM 49 from the present section number being smaller than the destined section number, the microcomputer controls the driving direction determination signal M-DIR to be at low voltage, and, on the contrary, if the direction of the search is found to be from an outer circumference to an inner circumference of the CD-ROM 49 from the present section number being greater than the destined section number, the microcomputer controls the driving direction determination signal M-DIR to be at high voltage.

And, by controlling the searching signal SRH to be at high voltage during a slide moving time, the microcomputer 54 makes the second, and third multiplexers 22 and 23 select inputs B, with which a preparation for controlling the spindle motor 46 required for the search is completed.

According to this, when the address generator 10 generates addresses Addr relevant to the present section number and experimental section number, the register file 15 applies data from storage areas assigned by the addresses Addr to the second latch 16 and the comparator 21 and makes the counter 20 start counting.

That is, since the second pulse generator 19 generates a reset signal RST in response to the search signal SRH according to a clock CLK, and the counter 20, reset by the reset signal RST of the second pulse generator 19 as the AND gate 18 makes a logical multiplification of the clock CLK and the searching signal SRH, starts to count outputs of the AND gate 18 from "0", the comparator 21 compares an output of the register file 15 and an output of the AND gate 18, to generate high voltage, if the output of the register file 15 is the same with, or greater than the output of the AND gate 18.

In this instant, since the second multiplexer 22 selects the high voltage of the comparator 21 and applies it to the spindle motor driving part 47 as a driving extent signal PWM-CONT, the spindle motor driving part 47 accelerates/decelerates the spindle motor 46.

And, as the counter 20 keeps on counting the clocks passed through the AND gate 18, if an output of the register file 15 is greater than an output of the counter 20, since the comparator 21 generates and applies low voltage to the second multiplexer 22, the second multiplexer 22 generates a low voltage driving extent signal PWM-CONT, to cease the acceleration/deceleration of the spindle motor 46.

According to this, movement of the slide stops and the microcomputer 54 generates a low voltage searching signal SRH, to make the second, third multiplexers 22 and 23 change over their inputs, which lets the driving extent control signal PWM-CLV and the acceleration/deceleration control signal DIR-CLV applied to the spindle motor driving part 47, to change over mode of the spindle motor to a linear velocity control mode, and on the same time, and to stop the counting operation of the counter 20 as the AND gate 18 produces "0".

And, when an output of the register file 15 is held at the second latch 16, the addition/subtraction mode determination part 17 subjects a driving direction determination signal M-DIR of the microcomputer 54, and a acceleration/deceleration control signal DIR-CLV and a guaranteed frame synchronization signal GFS of the digital signal processing and linear velocity servo part 53 to operation, to apply an acceleration/subtraction mode signal to the numerical computing element 13, with which acceleration/subtraction mode signal the numerical computing element 13 makes an addition/subtraction operation of the outputs of the first, and second latches 12 and 16 according to the acceleration/subtraction mode, and applies the operation results to the register file 15.

Therefore, since the first pulse generator 11 applies a write enable signal WE synchronized to the clock CLK to the register file 15 when the microcomputer 54 generates a write signal WR in a toggle pulse form, an output of the numerical computing element 13 is applied to the register file 15 through the first multiplexer 14, resulting to store it into the register file 15 as a new acceleration/deceleration data of the spindle motor for a section searched at the present time.

Herein, operation of the addition/subtraction mode determination part 17 is to be explained, referring to FIG. 7.

The addition/subtraction mode determination part 17 subjects the acceleration/deceleration signal DIR-CLV, the guaranteed frame synchronization signal GFS, and the driving direction determination signal M-DIR received from the digital signal processing and linear velocity servo part 53 and the microcomputer 54 to an operation for determining condition of the spindle motor 46 after a search. An output of the addition/subtraction mode determination part 17 represents an excessive or lack of deceleration(brake), or an excessive or lack of acceleration(kick) in control of the spindle motor 46 at the search.

Figure 3A:
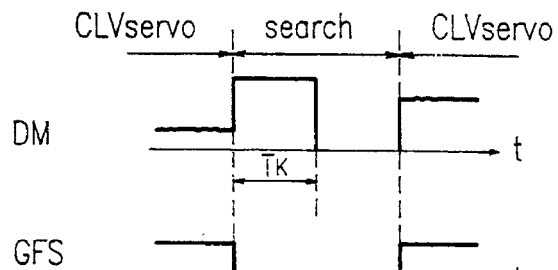
FIGS. 3A to 3F show wave patterns of driving voltages and guaranteed frame synchronization signals at searching with the conventional CD-ROM drive of FIG. 1.
Figure 3B:
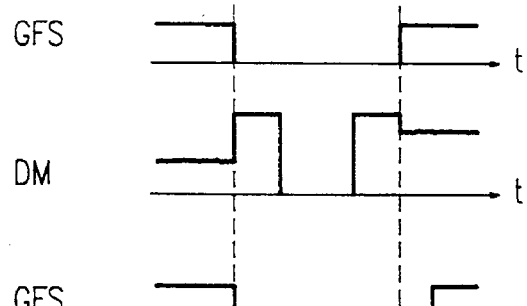
Figure 3C:
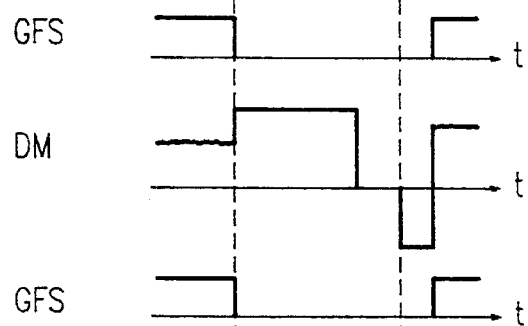
Figure 3D:
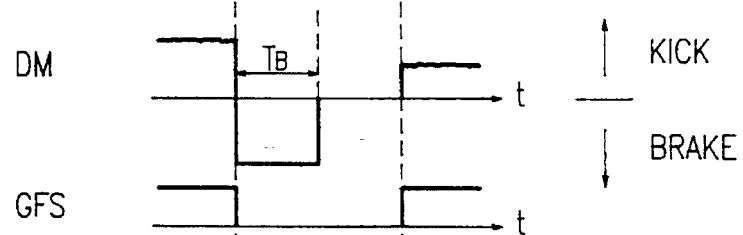
Figure 3E:
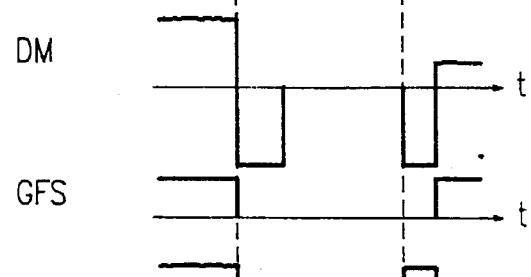
Figure 3F:
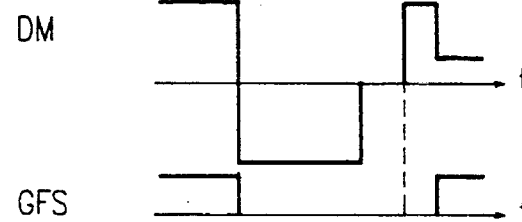

For example, the case of FIG. 3F is a case when the spindle motor is accelerated after finish of the search in a direction to make up an excessive deceleration caused by an excessive deceleration of the spindle motor 46 done in a linear velocity control mode when the CD-ROM is searched from an inner circumference to an outer circumference.

In this time, since the guaranteed frame synchronization signal GFS reaches to high voltage right after the search and the spindle motor 46 is accelerated in a linear velocity control mode, causing an acceleration/deceleration control signal DIR-CLV to become "1", resulting to a deceleration of rotation speed of the spindle motor 46 having controlled by the microcomputer 54 during the search, the driving direction determination signal M-DIR should be "0".

Accordingly, since it can be known that it is a case when a duration of a spindle motor deceleration within a section stored in the register file 15 is great, it can be known that the stored value should be reduced, for which, operation mode of the numerical computing element 13 is set to a subtracting mode(F=A−B).

On the other hand, if the guaranteed frame synchronization signal GFS reaches to high voltage right after the search, since it indicates that an appropriate spindle motor 46 control has been done, in which no adding/subtracting operation required, operation mode of the numerical computing element 13 is controlled to be in a mode in which the input data is passed.

As has been described, information on duration of acceleration/deceleration modified in the numerical computing element 13 renews the information stored in the register file 15 when the microcomputer toggles a write signal after the search, and operation of the spindle motor 46 is controlled using the modified duration of acceleration/deceleration every time a searching operation on the same section is repeated.

FIG. 8A is a detailed circuit diagram of the first pulse generator 11 in accordance with this invention.

A write signal WR is applied to the first flip-flop 35 at an input terminal thereof, and a clock CLK, inverted at the invertor 34, is applied to the first flip-flop 35 at a clock terminal CLK thereof.

Then, according to the clock CLK inverted in the invertor 34, the write signal WR is latched at the first flip-flop 35, outputs through a non-inversion terminal Q1 of the first flip-flop 35, and inputs to the second flip-flop 36 through an input terminal D2 thereof.

And, according to a clock CLK not inverted applied to the second flip-flop 36 at a clock terminal CK thereof, the non-inverted output of the first flip-flop 35 is latched and outputs from the second flip-flop 36 through an inversion output terminal $\overline{Q2}$ thereof.

Next, the non-inverted output of the first flip-flop 35 and the inverted output of the second flip-flop are applied to the AND gate 37, and logically multiplied into a write enable signal WE.

FIG. 8B is a detailed circuit diagram of the second pulse generator in accordance with this invention.

A search signal SRH is applied to the third flip-flop 31 at an input terminal D1 thereof, and a clock CLK is applied to the third flip-flop 31 at a clock terminal CK thereof.

Then, according to the clock CLK, the search signal SRH is latched at the third flip-flop 31, outputs from the third flip-flop 31 through a non-inversion output terminal Q1 thereof, and inputs to the fourth flip-flop 32 at an input terminal D2 thereof.

And, according to the clock CLK applied both to the third flip-flop 31 and the fourth flip-flop 32 at their clock terminals CK thereof, the non-inversion output of the third flip-flop 31 is latched at the fourth flip-flop 32 and outputs from the fourth flip-flop 32 through an inversion output terminal $\overline{Q2}$ thereof.

Then, the non-inverted output from the third flip-flop 31 and the inverted output from the fourth flip-flop 32 are, applied to the AND gate 33, and logically multiplied into a reset signal RST.

Figure 9A:
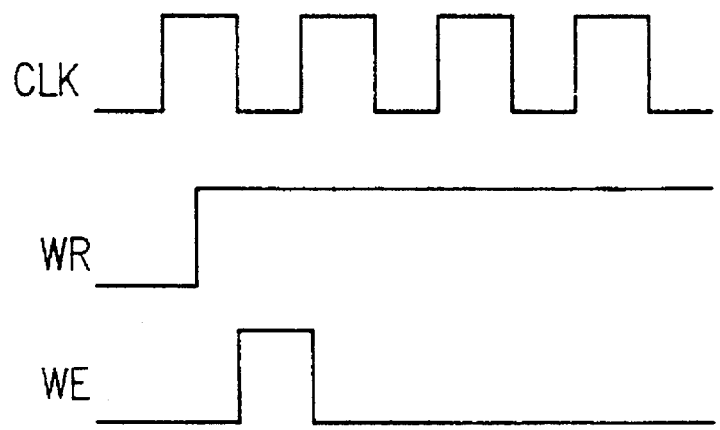
FIG. 9A illustrates wave patterns showing an example of an operation of the first pulse generator of FIG. 8A.
Figure 9B:
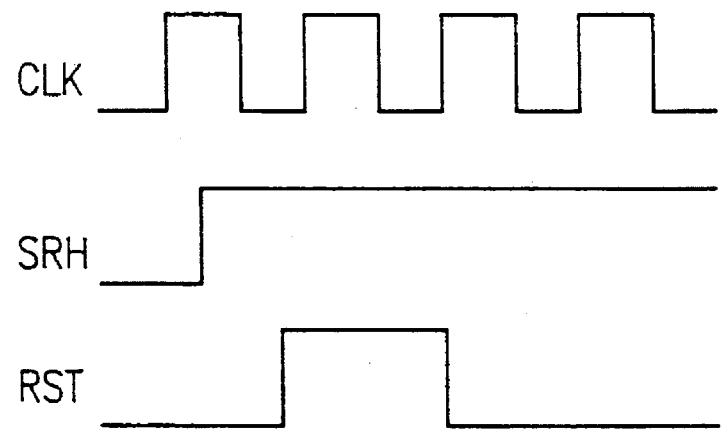
FIG. 9B illustrates wave patterns showing an example of an operation of the second pulse generator of FIG. 8B.

FIGS. 9A and 9B illustrate wave patterns of input signals of the clock CLK, the write signal WR, and the search signal SRH, and of output signals of the write enable signal WE, the reset signal RST, of the first, and second pulse generator 11 and 19.

FIGS. 10A to 10I illustrate wave patterns showing an example of an operation of the CD-ROM drive in accordance with this invention.

Operations of the CD-ROM drive of this invention as has been explained are made according to timings of the signal wave patterns shown in FIGS. 10A to 10I.

Figure 11:
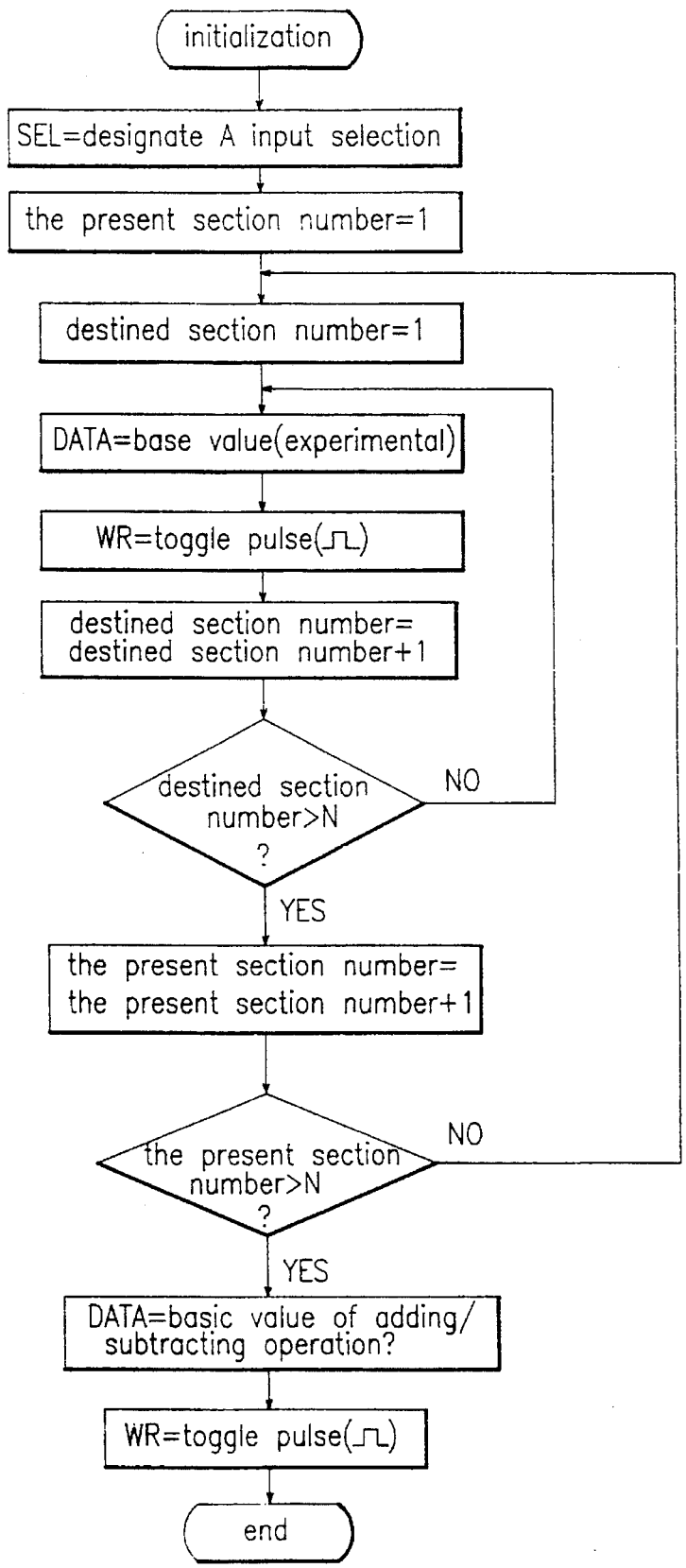
FIG. 11 is a flow chart showing sequence of operation at initialization of the CD-ROM drive in accordance with this invention.
Figure 12:
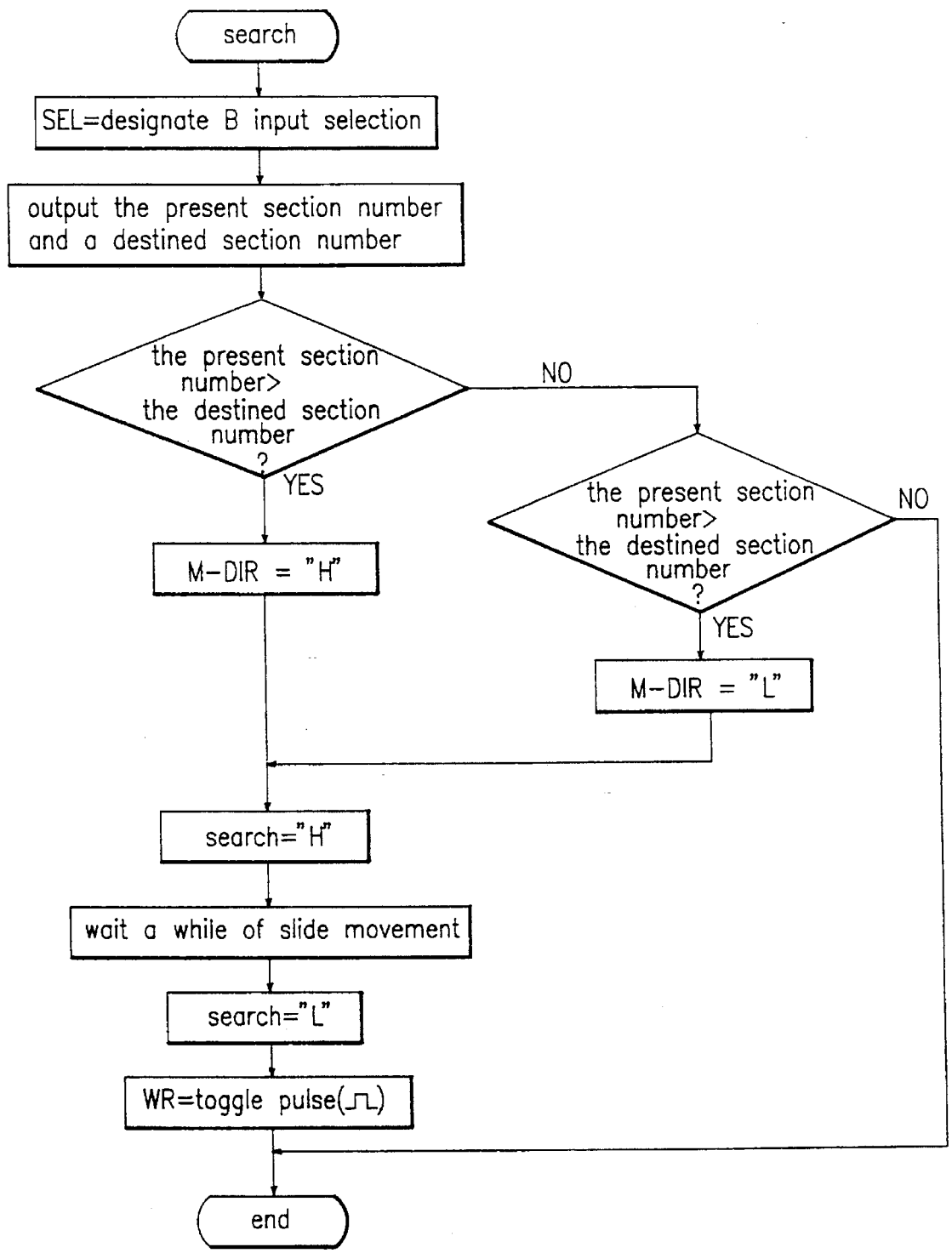
FIG. 12 is a flow chart showing sequence of operation at searching of the CD-ROM drive in accordance with this invention.

FIG. 11 is a flow chart showing sequence of operation at initialization of the CD-ROM drive in accordance with this invention, and FIG. 12 is a flow chart showing sequence of operation at searching of the CD-ROM drive in accordance with this invention.

That is, in case a searching operation is carried out, since the acceleration/deceleration control part 48 applies information on a modified duration of acceleration/deceleration to the spindle motor driving part 47 every time searching operations for the same section is repeated, to control drive of the spindle motor 46, recorded information detection from a CD-ROM can be done within a short time.

As has been explained, since the CD-ROM of this invention can make optimal control of the spindle motor by repeating searching operations based on durations of acceleration/deceleration of the spindle motor obtained with experiments even in case when a speed of the CD-ROM is changed, which allows a fast access duration, performance of the CD-ROM can be improved.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A CD-ROM drive comprising:

a pick-up for detecting recorded data from a CD-ROM;

a control signal generation means for generating a acceleration/deceleration control signal, a driving extent control signal, and a guaranteed frame synchronizing signal by processing a high frequency signal received from the pick-up;

acceleration/deceleration control means for receiving the acceleration/deceleration control signal, the driving extent control signal, and the guaranteed frame synchronization signal from the control signal generation part, outputting the acceleration/deceleration control signal and the driving extent control signal that are the same as the received acceleration/deceleration control signal and the driving extent control signal respectively in case mode is not a searching mode but a normal linear velocity mode, and modifying the acceleration/deceleration control signal and the driving extent control signal based on a result obtained by subjecting the acceleration/deceleration control signal, the driving extent control signal, and the guaranteed frame synchronization signal to an operation so that the guaranteed frame synchronization signal can reach to high voltage within a short time in case the mode is a searching mode and outputting the modified acceleration/deceleration control signal driving extent control signal; and, a spindle motor for rotating the CD-ROM in response to the acceleration/deceleration control signal and the driving extent control signal outputted from the acceleration/deceleration control means.

2. The CD-ROM drive as claimed in claim 1, wherein the acceleration/deceleration control means includes, addition/subtraction amount memorizing means for adding/subtracting data received from the control signal generation means and store added/subtracted data into a memory at a relevant address, addition/subtraction mode determination means for setting an addition/subtraction mode based on determination of a condition of the spindle motor after a search by subjecting the acceleration/deceleration control signal, the guaranteed frame synchronization signal, and a driving direction determination signal M-DIR received from the control signal generation means to an operation, and pulse width modulation pulse generation means for generating a driving signal and a driving extent signal on reception of a signal from the addition/subtraction amount memorizing means.

3. The CD-ROM drive as claimed in claim 2, wherein the addition/subtraction amount memorizing means includes, first pulse generation means for generating a write enable signal on reception of a write signal in response to a clock signal, address generation means for generating addresses for storing data on reception of section numbers at the present time and on a destination, a register file to be enabled by the first pulse generation means for storing the acceleration/deceleration data read in from an internal memory of the control signal generation means into an area assigned by the address generation means, a first latch to be enabled by a latch enable signal for holding data on duration of acceleration/deceleration from the control signal generation means as an adding numeral or a subtracting numeral, a second latch to be enabled by a clock for holding output of the register file as an added/subtracted numeral, numerical computing means for making an operation of outputs received from the first, and second latches in response to the addition/subtraction mode signal from the addition/subtraction mode determination means, and a first multiplexer for selecting one signal from a signal received from the numerical computing means and data of the control signal generation means in response to a selection signal.

4. The CD-ROM drive as claimed in claim 2, wherein the pulse width modulation pulse generation means includes, an AND gate for logical multiplication of a searching signal and a clock signal, a second pulse generation means for generating a reset signal on reception of a search signal in response to the clock signal, counting means to be reset by an output of the second pulse generation means for counting outputs of the AND gate, comparison means for comparing an output of the counting means and an output of the register file to output a high voltage comparison signal in case the output of the register file is the same or greater than the output of the counting means, a second multiplexer for selecting one signal as a driving extent signal from a driving extent control signal from the control signal generation means and a signal from the comparison means in response to a search signal, and a third multiplexer for selecting one signal as a driving signal from a driving direction determination signal and an acceleration/deceleration control signal, of the control signal generation means in response to a search signal.

5. The CD-ROM drive as claimed in claim 3, wherein the first pulse generation means includes, an invertor for inverting a clock, a first flip-flop for latching a write signal according to an output of the invertor, a second flip-flop for latching a non-inverted output of the first flip-flop according to a clock, and an AND gate for logical multiplication of an inverted output of the second flip-flop and a non-inverted output of the first flip-flop into a write enable signal.

6. The CD-ROM drive as claimed in claim 4, wherein the second pulse generation means includes, a third flip-flop for latching a search signal in response to a clock, a fourth flip-flop for latching a non-inverted output of the third flip-flop in response to a clock, and an AND gate for logical multiplification of an inverted output of the fourth flip-flop and a non-inverted output of the third flip-flop into a reset signal RST.

7. A method for controlling a CD-ROM drive having a spindle motor for driving a CD-ROM comprising:

an experimental value computing step for dividing a CD-ROM information area into N sections to make a searching operation classified by each of the sections, and averaging durations of acceleration/deceleration of the spindle motor to store the average values into an internal memory;

an initialization step for making a sequential reading of the average value of duration of acceleration/deceleration for each of the sections stored in the internal memory in the experimental value computing step, and storing the values into relevant area; and, an experimental value correction step for determining a control condition of the spindle motor every time the searching operations is made, and renewing the average value of a corresponding section read-in in the initialization step with the result of control condition determination.

8. The method as claimed in claim 7, wherein the initialization step includes, a first process for setting a selection signal for receiving data from the control signal generation means, and setting the present section number and the destined section number to "1", respectively;

a second process for storing the experimental data along the present section number and the destined section number set in the first process, and repeating the experimental value storing operation of data obtained from each operation with the destined section number increased by "1" and, at the same time, determining whether the destined section number is greater than "N"; and, a third process for, if the destined section number reaches to "N" in the second process, repeating the second process by increasing the present section number by "1", and, if the present section number reaches to "N", finishing the initialization operation.

9. The method as claimed in claim 7, wherein the experimental value correction step includes, a first process for setting a selection signal to select an output from an addition/subtraction operation, setting the present section number and the destined section number along sections to be searched, and determining whether the present section number is greater than the destined section number, a second process for determining by searching from an outer circumference to an inner circumference of the CD-ROM if it is found in the first process that the present section number is greater than the destined section number, and determining by searching from an inner circumference to an outer circumference of the CD-ROM if it is found in the first process that the present section number is smaller than the destined section number, a third step for, if direction of a search is determined in the second process, accelerating/decelerating the spindle motor during a slide moving time and, at the same time, determining a control condition of the spindle motor, and determining whether the slide moving duration is finished, and a fourth process for, if it is found in the third process that the slide moving duration is finished, correcting data on duration of acceleration/deceleration according to controlled condition of the spindle motor, and controlling the spindle motor with modified data on duration of acceleration/deceleration in the following searching operation.

* * * * *